May 8, 1934. E. J. SWEETLAND 1,958,385
LAWN SPRINKLING MEANS AND SYSTEM
Filed Nov. 3, 1930
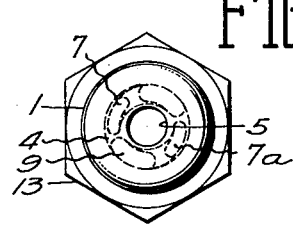
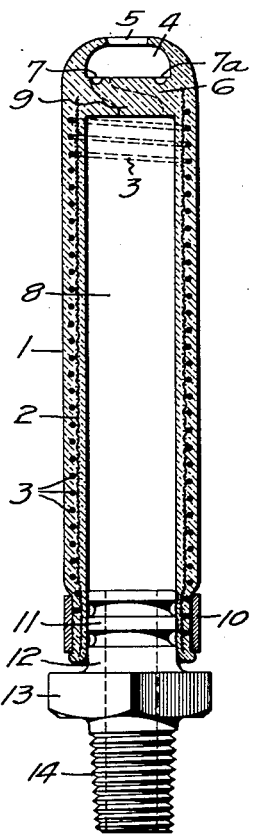
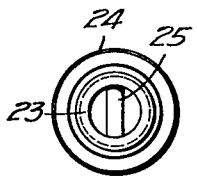
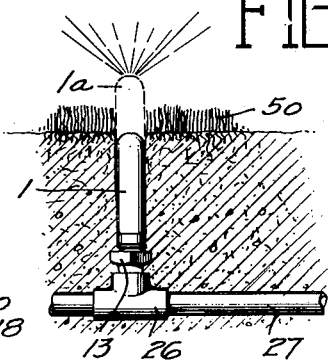
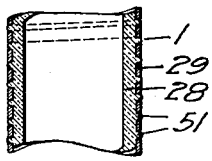
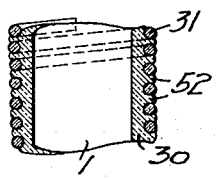
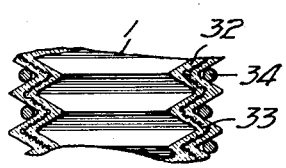
INVENTOR
Ernest J Sweetland Patented May 8, 1934

1,958,385

UNITED STATES PATENT OFFICE 1,958,385

LAWN SPRINKLING MEANS AND SYSTEM

Ernest J. Sweetland, Piedmont, Calif.

Application November 3, 1930, Serial No. 492,880

18 Claims. (Cl. 299—61)

This invention relates to lawn sprinkling means and particularly to means which is normally concealed or partially concealed below the level of the lawn and which automatically rises to the surface or to a point above the surface as soon as water pressure is applied.

An object of the invention is to eliminate the unsightly appearance of a metallic sprinkler head on the surface of the lawn. A further object is to provide a sprinkling means which completely disappears and offers no interference whatever to the operation of lawn mowers, rollers and other similar devices.

A further object is to provide a sprinkler of a soft, pliable nature which is permissible on athletic fields, playgrounds, etc. where any rigid metallic parts on the surface of the lawn would be liable to cause injury to those playing on the field.

A further object is to provide a sprinkler which is capable of uncovering itself and going on with its service in the event that it is accidentally buried by being trodden upon or is covered up through distribution of soil or fertilizer.

A further object is to eliminate moving parts such as are used in the present telescopic types of lawn sprinklers. The present telescopic types of lawn sprinklers depend upon one metallic member being forced by water pressure upwardly through an outer sleeve and to operate perfectly they must form a sealed joint when the rising member reaches its limit of travel. This sealed joint has the objection that if a gasket is used, it will require replacement in time and if a gasket is not used, then a ground joint is required which in time begins leaking due to wear or to particles of grit falling into the apparatus at times when the water is turned off. Furthermore, particles of grit or grass may interfere with the free sliding of the telescopic members and thus completely prevent the sprinkler from performing its function.

A further object is to provide a rising type lawn sprinkler which is inexpensive in construction and easily replaced.

A further object is to provide a rising type sprinkler which may easily be removed from the ground by a wrench which can be inserted through the tube of the sprinkler thus avoiding the necessity of disturbing the ground when the sprinklers are replaced.

A further object of the invention is to provide a rising type sprinkler head the operating parts of which are non-metallic.

A further object is to provide a lawn sprinkler with flexible orifices which adjust themselves to varying water pressure to give a satisfactory distribution of water without excessive formation of mist.

A further object is to provide a rising type of lawn sprinkler which completely eliminates the use of either a ground joint or gasket joint, either of which in practice are objectionable.

A further object is to provide a sprinkler head having spiral nozzles with a slight taper which gives a more satisfactory spray than nozzles of uniform diameter.

The invention possesses other advantageous features, some of which with the foregoing, will be set forth in detail in the following description where I shall outline in full that form of my invention which I have selected for illustration in the drawing accompanying and forming part of the present specification. In said drawing I have shown certain forms of my invention in order to illustrate its use but it is to be understood that I do not limit myself to the forms shown, since the invention as set forth in the claims may be embodied in a great variety of forms and still come within the spirit of the invention.

Referring to the drawing:

Figure 1 is a sectional elevation of the sprinkler which is approximately the full size that would ordinarily be used.

Figure 2 is a plan view of Figure 1.

Figure 3 is a modified form wherein a separable metallic sprinkler head is adapted to the elastic material forming the extension tube.

Figure 4 is an inverted plan of Figure 3.

Figure 5 shows in reduced scale the lawn sprinkler as installed in the ground.

Figure 6 is a modified method of making the extension tube.

Figure 7 is a further modification of the extension tube.

Figure 8 is a further modification in which the walls of the tube are corrugated to facilitate longitudinal extension.

Throughout the following specification, I shall refer to certain portions of the construction as "rubber". Wherever I use the term "rubber" I intend to embrace the various compositions of rubber or similar elastic material which is adapted to the purpose.

I have found rubber compositions to be particularly well adapted to my purpose as it possesses not only the desired elasticity to permit the sprinkler head tube to stretch and rise above the surface of the ground, but I have discovered other advantages in the use of rubber which I believe to be entirely new in the art. For example, I find that the quality of spray formed with a rubber sprinkler head as shown in Figure 1 is far superior to the spray obtained with the well known types of sprinkler heads that are made of metal in that my device delivers most of the water in small well formed drops resembling rain-drops with a minimum of fine mist or atomization. Such atomization or formation of an excessive amount of fine mist is highly objectionable because a large percentage of the water thus discharged from a sprinkler is lost due to evaporation and blowing away of the particles before they settle on the lawn. I attribute the important advantages which my elastic device possesses in this regard to the fact that the apertures through which the water discharges, as well as the chamber 4, are non-rigid and tend to yield slightly to the passing currents of water rather than to sharply cut the passing currents up into minute particles such as are formed by so-called atomizers of different types. A further important feature having a bearing upon the same subject is that the discharge apertures such as 5 and 7 and 7a, as well as the chamber 4, actually dilate as pressure increases so that the sprinkler accommodates itself to varying pressures of water in the most effective possible manner. With the ordinary metallic sprinkler head where all walls and apertures are of rigid material, I find that the amount of atomization increases excessively when water pressure is high because the velocity through the rigid apertures increases with the increased pressure without any corresponding increase in the area of the discharge aperture and the chamber adjacent to it, whereas in my construction the working parts of the sprinkler head dilate or contract with variations in pressure so that in reality I have a device which automatically accommodates itself to varying pressures in such manner as to give the most satisfactory irrigating results.

It should be noted also that the area of ground which may be covered with the well known types of metallic sprinkler heads does not increase materially as the pressure increases as may be noted by the fact that such heads are commonly installed at uniform spacing with little regard for the amount of pressure which obtains in any particular case. This is due to the fact that the excessive velocity through the metallic heads at high pressure produces such a fine spray that it does not carry much, if any, farther than the coarser spray produced by the lower pressure. With my elastic sprinkler head, wherein the working parts dilate and accommodate higher pressures without forming excessive spray, a larger area may be covered at high pressures than at lower ones.

Referring in detail to the drawing, in Figure 1, 1 is a flexible tube made of rubber or similar material. This tube is peculiarly reinforced to permit longitudinal extension and prevent lateral expansion when pressure is applied. This is accomplished by reinforcing the rubber with a layer of knitted fabric 2 which is placed in the rubber with the ribs of the fabric at right angles to the axis of the tube, as knitted fabric stretches freely at right angles to the ribbing but stretches very little in the opposite direction. While I prefer knitted fabric for this use, I do not limit myself but may use any form of fabric which serves to permit the tube to extend longitudinally but prevent the rubber from blowing out between the spiral reinforcing cords 3. The functions of the fabric 2 are four-fold: (a) It furnishes a fine network through which the inner walls of the rubber cannot blow out under pressure even when the spiral reinforcing cords 3 are considerably separated due to the distension of the tube. (b) It forms a backing which prevents the rubber from cutting against the reinforcing cords 3. (c) It gives a considerable amount of peripheral strength to the tube, and (d) it performs the very important function of limiting the extent to which the tube 1 may stretch under pressure because when this fabric has stretched out to its limit of elasticity, which is the point at which the threads of the fabric have straightened out, then the tube will stretch no farther. In practice, I have found that by using two or more layers of knitted fabric which may be spirally formed about the core with a suitable layer of rubber between them, the cords 3 may be omitted entirely if desired. Furthermore, I may substitute metallic wire in place of the cords 3 if desired, although I have found in practice that it is preferable to use a strong cotton cord for the purpose, that is rubberized by treatment in a solution of rubber and then dried before winding it on the tube. I find also that the knitted fabric works more satisfactorily if rubberized by being dipt into or otherwise treated with rubber solution and then dried, before it is put in place in the formation of the tube. In the construction shown in Figure 1 the entire flexible tubular unit is formed and vulcanized in one piece and I prefer a rubber composition that is pliable and reasonably soft. Into the upper end of the tube is formed a space 4 with a circular aperture 5. The partition member 6 is provided with two or more spiral nozzles 7 and 7a in such manner that when the body of the tube 8 is filled with water under pressure, it discharges through the nozzles 7 and 7a to form a spiral swirl in the cavity 4 which causes the water to discharge through the orifices 5 in the form of a spray. I prefer to form the spiral orifice, such as is shown at 9, which terminates in the nozzle 7, with a taper, so that the upper or discharge end of the orifice is smaller than the inlet for I have found that a tapered nozzle delivers a more satisfactory spray than one of uniform diameter throughout. The lower end of the rubber extension tube 1 is secured by clamp 10 against the corrugated walls 11 of the casting 12 which is provided with the hexagonal nut 13 and standard tapered pipe thread 14 by means of which it is secured in standard pipe fittings that are operated beneath the surface of the lawn.

In Figure 3 is shown a modification wherein the rubber extension tube 15 may be manufactured in lengthy pieces to be cut up in units of the required length. In this instance, a metallic sprinkler head is provided having a dome shaped stamping or casting 16 with an orifice 17 and into the piece 16 is pressed a circular block 18 having tapered spiral orifices 19 which terminate in the nozzles 20 and 20a. 21 is a threaded collar which engages the threads on the member 16 and the completed sprinkler head is held firmly in the rubber tube by the clamp 22. The lower end of the extension tube is secured to the nipple 23 by the clamp 24. The nipple 23 is provided with a pin 25 which is riveted across the axis of the nipple so that when it is desired to remove the unit from the lawn for replacement the dome 16 is first unscrewed and a slotted wrench is inserted down the tube to engage the pin 25 and in this manner the unit may be removed without disturbing the grass or earth surrounding the tube. The pin 25 is shown in further detail in inverted plan view in Figure 4.

Figure 5 illustrates the assembled sprinkler unit of the tube illustrated in detail in Figure 1, in its normally installed position in the lawn wherein the casting 13 is secured into the pipe T 26, which is supplied with water for irrigation through pipe 27, which is assumed to be a part of a system of piping with sprinkler heads arranged at regular intervals throughout the lawn area. Numeral 50 represents grass growing on the surface of the lawn which normally conceals the sprinkler head entirely. As soon as water under pressure is turned into the pipe 27, the tube 1 is stretched to the position indicated by the dotted lines at 1a and the sprinkler operates until the water is turned off, when the elasticity of the tube draws it back into its normal concealed position. It is understood of course that the force which causes the tube to rise to the position shown in 1a is the hydraulic pressure within the tube bearing against the partition member 9, the apertures through which are not sufficiently large to relieve entirely the pressure within the chamber 8. In operating sprinklers of this type I have found that garden implements such as wheel barrows, lawn mowers and the like may be freely passed over the sprinkler head without endangering its satisfactory operation and even though earth be tightly packed around and over the top of the sprinkler head, the operation is not interfered with in the least as the jets from the aperture 5 quickly wash away and débris that may cover the device as it forces its way upward. I have also found that the flexible rubber which forms the entire top of the sprinkler as shown in Figure 1, does not clog up readily with gravel or débris that may get into the chamber 4, because if a foreign body enters the chamber which would tend to clog a metallic sprinkler head, it is promptly freed by the flexing of the rubber which will become temporarily distorted to permit a foreign body to escape assisted by the water pressure from within.

Figure 6 represents a modified form of the tube 1 wherein the numeral 28 designates a suitable rubber composition surrounded by a flat spiral metallic reinforcing spring 29. In this modification an elastic reinforcing fabric similar to the knitted fabric described in Figure 1 may or may not be used as desired, the spring itself being sufficient to furnish a satisfactory reinforcement for the tube except where high pressure justifies the use of additional reinforcement. It should be understood that when this modified form is used the spring extends longitudinally when pressure is applied within the tube giving substantially the same action as is illustrated in Figure 5.

Figure 7 is a further modification wherein the numeral 30 designates the rubber tube surrounded by a coiled metallic spring 31. This form differs from Figure 6 only in that in this case the spring is formed of round wire whereas a flat spring material is used in Figure 6. Suitable reinforcing fabric may be used in Figure 7 if desired.

In both Figure 6 and Figure 7 the springs are embedded within the rubber to a sufficient extent to produce a fairly smooth surface on the outside of the tube which will slide freely through the ground during the upward and downward movements of the tube. A further advantage of partially embedding the springs within the rubber is that the little rubber corrugations shown at 51 (Fig. 6) and 52 (Fig. 7) maintain equality in spacing of the spring member during the extension of the tube, whereas if a smooth rubber tube were placed within the spiral spring the tendency would be for the convolutions of the spring to remain closed together at some points and widen apart excessively at other points and thus increase the tendency of the pressure to blow the rubber out between the widened convolutions of the springs. In these modifications where a fabric is omitted, the resistance of the spring to extension tends to limit the tube from lengthening excessively at the normal pressure for which the tube is designed, and the strength of the spring is adjusted to suit the particular pressure at which it is to be operated.

In the modification shown in Figure 8 the tube is pleated or corrugated in its normal position but when pressure is applied the corrugations tend to straighten out, thus affording an excessive amount of elongation at moderate pressure. In this figure the numeral 32 designates a rubber composition reinforced with fabric 33 and it may or may not be supplied with the metallic reinforcing rings 34. In this modification, the use of an elastic fabric is not absolutely necessary, since the zigzag construction of the walls permits of sufficient lengthening of the tube even though the fabric itself does not stretch to any substantial degree.

It should be understood that the principle of my invention may be employed by a great many modifications of the ideas herein illustrated. For instance, the corrugations shown in Figure 8 may be spiral as would be the case if the tube were molded upon a spirally threaded core, or the corrugations may be confined to the inside of the tube including the reinforcing fabric while the outside of the tube has straight smooth walls. By such a construction the advantages of the zigzag path of the fabric would be obtained yet the outer surface would remain smooth to slide freely through the ground.

Throughout the following claims where the word "stationary" is employed it relates to the permanent fixed location of the sprinkler heads throughout a lawn or garden, as distinguished from spray nozzles that are designed for use at the end of a portable tube or pipe, such as those designed for spraying trees or for manual use in connection with the ordinary garden hose or the like.

In those claims where the terms "swirl chamber" are used, they refer to the chamber substantially as indicated by the numeral 4 in Figure 1 wherein a swirling motion is imparted to the water by rotary or spiral discharge through the nozzles 7 and 7a.

Where the term wrench engaging means is employed in any of the following claims it is intended to define any means within the nipple 23 which serves the purpose of engaging a wrench which may be inserted through the tube 15 to unscrew the nipple from an underground pipe fitting. While I have illustrated the pin 25 as one means of carrying out this object, it should be understood that I am not limited to the use of a pin but may substitute any wrench engaging means that will prevent a key or wrench inserted in the nipple from turning around when pressure is applied in removing or inserting the nipple.

While I prefer to use the rubber sprinkler head in combination with the elastic tube 1, it should be understood that I am not limited to such use and that the flexible tubular member may be omitted and the rubber sprinkler head may be attached directly to a rigid nipple where the advantages of permitting vertical rising of the head when in action, are not required.

It should be understood that for the purposes of this specification and claims the word "surface" when referring to a lawn is intended to mean the level of a freshly cut lawn. A sprinkler head is considered to be below the surface when it is below the lowest level reached by the blades of the lawn mower.

Having thus described my invention what I claim is:

1. A lawn sprinkling device comprising a sprinkler head and supply conduit made of flexible material below the surface of the lawn and supported in vertical position by direct contact with the earth below the lawn, said conduit being capable of elongation when internal pressure is applied.

2. A lawn sprinkling device comprising a sprinkler head made of rubber and placed below the surface of the lawn, the elasticity of said rubber being so controlled as to cause the head to rise vertically above the ground when water pressure is applied.

3. A lawn sprinkling device comprising a tube of elastic material fixed in stationary position to an underground water pipe, said tube being normally below the surface of the lawn and capable of longitudinal extension but restricted against substantial lateral expansion.

4. A lawn sprinkling device comprising a sprinkler head, an underground tubular member to supply water under pressure to said sprinkler head, said tubular member being formed of elastic material reinforced to prevent lateral expansion and permit longitudinal extension said tubular member being below the lawn surface and fixed to a stationary underground conduit.

5. Lawn sprinkling means comprising a spray producing sprinkler head, a source of water supply under pressure and an underground elastic tubular element connecting said sprinkler head with said source of water supply, said tubular element being reinforced internally to prevent lateral expansion and to permit longitudinal extension and being rigidly mounted at its base upon a fixed underground pipe without moving parts between said element and said pipe.

6. Lawn sprinkling means comprising a sprinkler head associated with stationary means of supplying water to said sprinkler head, an underground elastic tube to conduct the water from said source of water supply to said sprinkler head, said elastic tube having a non-metallic reinforcing fabric imbedded in the walls thereof capable of permitting the tube to extend longitudinally when water under pressure is applied.

7. A sprinkling device comprising an elastic flexible water distributing element rigidly fixed to a stationary subterranean water conduit and extending vertically from said conduit to the surface of the ground, means of controlling the elasticity of said element to permit the sprinkling device to rise above the surface of the ground when water pressure is applied and return below ground when pressure is released.

8. A sprinkling device comprising an elastic tube normally surrounded by and in contact with the soil of a lawn and having its upper extremity even with or lower than the surface thereof, a water pipe beneath the surface of said lawn and connected to said tube, a nozzle near the upper extremity of said tube to restrain the flow through said tube and cause a pressure to be formed within the tube during operation whereby the tube is stretched to raise the top thereof to a point above the level of the lawn.

9. A tube for connecting lawn sprinkling means with an underground stationary source of supply of water under pressure said tube having spiral reinforcements which permit said tube to extend longitudinally during the application of water pressure thereto said tube comprising elastic means of drawing it below the surface of the lawn immediately when water pressure is shut off.

10. Lawn sprinkling means comprising a tube and removable sprinkler head at the upper end of said tube, a nipple at the lower end of said tube for making connection with an underground pipe, and means within said nipple to receive a wrench adapted to be inserted within said tube for the removal of said tube from the ground.

11. Lawn sprinkling means comprising an underground water pipe, an elastic tube associated with said pipe and normally placed in a substantially vertical position and surrounded by the earth underlying the lawn, a perforate partition adjacent to the upper extremity of said sprinkling means which causes pressure to build up within said tube to cause said tube to stretch and lift the sprinkling means to a point above the surface of the lawn during the operation of said sprinkling means.

12. A hose structure wherein the walls are reinforced with a knitted fabric the ribs of said fabric being located peripherally within the walls of said hose so that the hose is free to stretch lengthwise but is restricted by the ribs of the fabric from peripheral expansion a nozzle on one end of said hose having a restricted passageway whereby a fluid pressure may be built up in said hose to cause it to stretch lengthwise when under pressure.

13. Lawn sprinkling means comprising an underground water pipe an elastic tube associated with said pipe and normally disposed in a substantially vertical position below the surface of the lawn, a sprinkling nozzle at the upper end of said tube having restricted passageways that are so related to the water pressure and the discharge required that sufficient pressure will build up within the tube to cause the sprinkler head to rise above the surface of the lawn during the time that water pressure is applied, the elasticity of said tube being such that it will return said sprinkler to its normal position when water pressure is shut off.

14. A lawn sprinkling system comprising an underground water pipe, a flexible non-metallic hose vertically attached to said pipe of sufficient length to reach from an outlet in the pipe to the surface of the lawn, a nozzle at the upper end of said hose, and said hose being supported by direct contact with the surrounding earth and being strengthened by peripheral reinforcements which permit longitudinal extension of said hose but at the same time restrict lateral expansion thereof.

15. A device for projecting a liquid comprising an elastic tube reinforced peripherally but capable of substantial longitudinal extension when pressure is applied within said tube, a nozzle at one end of said tube having an opening adapted to discharge a liquid, said opening being so restricted as to maintain sufficient pressure within the tube when in normal operation as to cause said tube to increase materially in length and automatically force said nozzle to a point substantially in advance of the place occupied by said nozzle when said tube is relieved of internal pressure.

16. A device for projecting a liquid comprising a hose made of elastic material and having a spiral reinforcement but having no reinforcement to prevent longitudinal extension, a nozzle at one end of said hose to project a liquid, said nozzle being so restricted as to cause pressure to build up within the hose and cause said hose to increase substantially in length.

17. Lawn sprinkling means of the imbedded type comprising an elastic conduit permanently secured at its lower end to an underground pipe and at its upper end to a sprinkler nozzle substantially even with the lawn surface, said nozzle having fluid restricting orifices whereby a fluid pressure may be built up within said conduit and cause elongation thereof.

18. Lawn sprinkling means of the imbedded type comprising an upright conduit with a removable sprinkler head, a threaded fitting at the lower end of said conduit for connection to an underground water conduit, wrench engaging means within said conduit accessible from above upon removal of said sprinkler head.

ERNEST J. SWEETLAND.